Aug. 12, 1958  R. W. MARZ  2,846,705
LINE DRESSER
Filed March 18, 1955
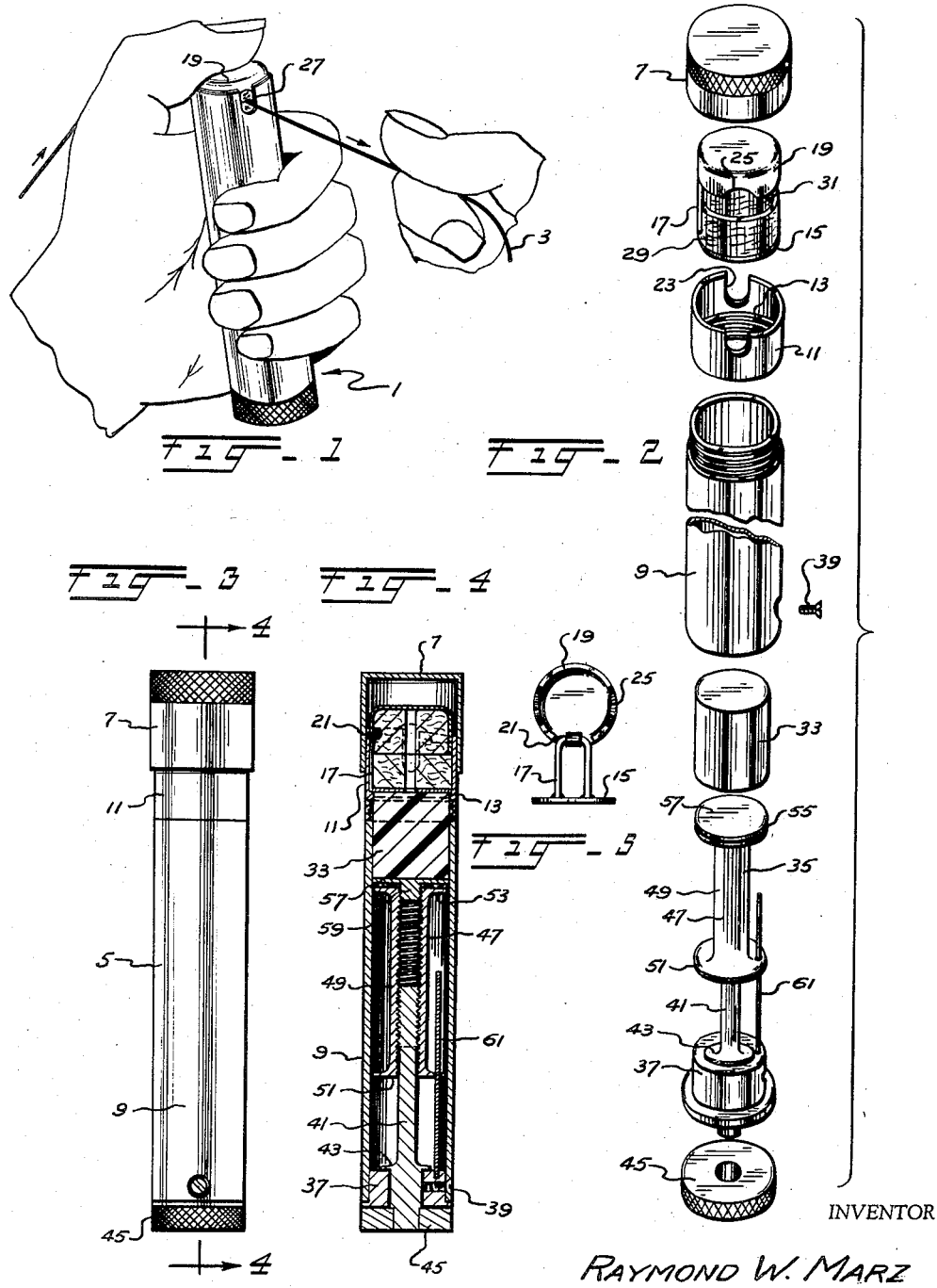
INVENTOR
RAYMOND W. MARZ
BY
ATTORNEY

United States Patent Office 2,846,705
Patented Aug. 12, 1958

2,846,705

LINE DRESSER

Raymond W. Marz, Ann Arbor, Mich.

Application March 18, 1955, Serial No. 495,164

6 Claims. (Cl. 15—134)

The present invention relates to line dressers, and more particularly to devices for applying dressing such as wax or grease or the like to flexible filaments for lines such as fishing lines, for the purposes of strengthening, preserving and protecting them, and to improve the running qualities of the lines.

It is well known that a common method of dressing a line is simply to pass the line over a block of wax. However, this type of line dressing has been largely unsatisfactory, in that the wax tended to clog on the line and the line was waxed on only one surface thereof. In an effort to correct these difficulties, it has been proposed to pass a line such as a fishing line through a body of absorbent material saturated with a dressing such as wax or grease or the like so as to equalize distribution of the dressing all around the line and prevent excess deposition of dressing on the line. However, such line dressing devices could not be conveniently handled nor carried about without smearing the dressing on the clothes and person of the operator. Moreover, such dressing devices were clumsy to handle and operate, did not provide for firm engagement between the absorbent material and the line, and readily dried out after a short period of use.

Although many attempts were made to overcome the foregoing difficulties and other disadvantages, none, as far as I am aware, was entirely successful when carried into practice commercially on an industrial scale.

Accordingly, it is an object of my invention to provide a line dresser which will quickly and easily apply dressing to a line.

Another object of the invention is to provide a line dresser enclosed in a container in such a way as to prevent undesirable escape or leakage of the dressing compound.

The invention also contemplates providing a line dresser which may be conveniently held in the hand in use.

It is a further object of the invention to provide a line dresser in which the pressure applied to the line during passage between the dressing applicators may be regulated at will.

The invention further contemplates providing a line dresser in which dressing may be supplied to the dressing applicator means entirely within the body of the dresser. It is another object of the invention to provide a line dresser with a self contained supply of dressing.

Finally, it is an object of my invention to provide a line dresser which will be neat and attractive in appearance, inexpensive to manufacture, simple in operation, and rugged and durable in use.

Other objects and advantages will become apparent from the following description taken in conjunction with the accompanying drawing, in which:

Figure 1 is a perspective view of my novel line dresser in use;

Figure 2 depicts an exploded assembly view of the various parts of my novel line dresser;

Figure 3 is an elevational view of the exterior of my novel line dresser when closed for carrying;

Figure 4 is a sectional elevational view on the line 4—4 of Figure 3; and

Figure 5 is an elevational view of the pad retaining means of my novel line dresser.

Referring now to the drawings in greater detail, I have shown my novel line dresser generally indicated at 1; and in Figure 1, I have shown the manner in which line dresser 1 is adapted to be held in the hand while a line such as a fishing line or more particularly a fly line 3 is drawn through the upper portion of the line dresser so as to apply evenly to all sides of line 3 a dressing such as wax or grease or other suitable dressing material for the purpose of strengthening, preserving and protecting the line and improving its free-running qualities.

Line dresser 1 consists of a generally cylindrical container 5 having a cylindrical cover 7 slidable tightly over the upper end thereof for the purpose of sealing out dirt and moisture and the like and preventing evaporation or drying or spilling of the dressing. Container 5 comprises a cylindrical barrel 9 having a cylindrical sleeve 11 screw-threadedly engageable with the upper end thereof, sleeve 11 having an internal annular flange 13 spaced between the ends thereof.

As perhaps best seen in Figure 5, a perforate shelf 15 comprising a circular metal disc having at least one hole therethrough is adapted to rest on flange 13. An upstanding wire wicket or hinge member 17 in the form of an inverted U is fixed by soldering or the like to a side edge of shelf 15 to provide hinged connection between the shelf and an inverted cup-shaped closure member 19. Member 19 is hingedly secured to hinge member 17 by means of an inwardly and upwardly curled tongue 21 formed from a bent up strip of the side wall of member 19. Sleeve 11 is provided with a pair of diametrically opposed slots or recesses 23 which are complementary to a pair of similar slots or recesses 25 in the side walls of closure member 19. When the assembly shown in Figure 5 is placed within sleeve 11 and member 19 is closed, recesses 23 and 25 will define between themselves a pair of diametrically opposed openings 27 in the container side walls.

Means for applying dressing to a line are provided, comprising pads 29 and 31. Pad 29 is the lower pad and is adapted to rest on perforate shelf 15. Pad 29 may be made of heavy felt, in cylindrical form, and may have at least one vertical hole therethrough corresponding to the at least one hole in shelf 15. Upper pad 31 is similar in shape and construction to pad 29, and is received and retained within the cup of closure member 19. The natural resiliency of the felt will hold member 31 within member 19.

Carried within the hollow interior of container 5 is a body of dressing 33 which may be wax or grease or other suitable dressing compound. The dressing will be pressed against shelf 15 to pass through the at least one hole therein and up to the interface of pads 29 and 31, at which point it will be applied to the line passing between the two pads. To this end, means for pressing the body of dressing 33 against shelf 15 are provided, comprising a plunger assembly 35 adjustably retained within cylindrical barrel 9 by means of an annular interior collar 37 held in place by a set screw 39 passing through barrel 9 and into collar 37. A spindle 41 is mounted for rotation in collar 37 between integral locator flange 43 on the spindle and knurled knob 45 pressed or otherwise fixed on the lower end of spindle 41. The upper end of spindle 41 is exteriorly screw-threaded for screw-threaded engagement with the interior of an interiorly screw-threaded plunger 47 having a long, hollow shank portion terminating downwardly in an annular outwardly extending centering flange 51 and upwardly in an annular outwardly extending head 53. A deformable packing ring 55 of rubber or leather or fiber or the like is clamped on head 53 by means of a flat, disc-shaped plunger face 57 having an axially disposed screw-threaded stud screw-threadedly engageable in the upper end of plunger 47. A guide rod 61 is fixed at its lower end to collar 37 and extends slidably through a hole in centering flange 51 for the purpose of preventing rotation of plunger assembly 35 relative to container 5. The operation of my novel line dresser is as follows:

Line dresser 1 may be carried in the pocket for use at any time. When it is desired to apply dressing to a line, cover 7 may be removed and closure member 19 swung upward. Since pad 31 is removably attached to member 19, pad 31 will be separable from pad 29 and will swing up and away from pad 29 when the closure member is opened. The line to be dressed may then be laid on top of pad 29 and passing through recesses 23 in sleeve 11. The closure member will then be closed so that pads 29 and 31 are in contact with the line between them and running through the opposed openings 27 formed by recesses 23 and 25 when closure member 19 is in closed position. Line 3 may then be pulled through the dresser; and at the same time, the thumb or a finger may be held on closure member 19 to determine the pressure between pads 29 and 31, and thus, to some extent, the amount of dressing which will be applied to the line.

When it becomes apparent that insufficient dressing is being applied to the line, despite the pressure exerted on closure member 19, it becomes necessary to renew the dressing of the pads. In order to do this, it is necessary only to turn knurled knob 45. This in turn causes spindle 41 to rotate, which would ordinarily cause plunger assembly 35 also to rotate. However, guide rod 61 is holding plunger assembly 35 against rotation relative to the container, with the result that the screw-threaded engagement of spindle 41 and plunger assembly 35 causes the latter to rise as seen in Figure 4. Thus, plunger face 57 presses dressing 33 against shelf 15. A portion of the dressing will pass through the holes in shelf 15 and may either impregnate the material of the pads, or, if the pads are not made of dressing-pervious material, may pass upward through the holes in the pad. In either event, dressing is forced to the interface of the pads, at which point it may be contacted and drawn off by the line passing between the pads.

When the quantity of dressing 33 is exhausted, a new cylindrical slug of dressing may be inserted simply by unscrewing sleeve 11 from barrel 9 and placing a new slug of the dressing on plunger face 57.

When it is desired to replace or clean pads 29 or 31, it is merely necessary to lift out the unitary assembly of members 15, 17, 19, 29 and 31 from its seat on flange 13 in sleeve 11.

Thus, it will be seen that my novel line dresser may be conveniently held in the hand and will present to the hand a smooth, unbroken surface. Moreover, it will be seen that the dressing and pads impregnated with dressing are retained entirely within the container so that they may not soil the person or clothing of the operator. Furthermore, it will be seen that the dressing between the pads may be quickly recharged when spent and that when the supply of dressing within the container is exhausted, it may be quickly renewed. Finally, it will be seen that my novel line dresser is simple in construction, easy to operate, and dependable in use.

Thus, it will be seen that I have achieved all of the objects of my invention stated above.

Although the present invention has been described in conjunction with a preferred embodiment, it is to be understood that modifications and variations may be resorted to without departing from the spirit and scope of the invention, as those skilled in the art will readily understand. Such modifications and variations are considered to be within the purview and scope of the invention and appended claims.

I claim:

1. A line dresser for applying dressing to a line comprising an open end elongated container having a pair of abutting axially aligned separable pads disposed in said open end, a dressing reservoir within said container and partially defined by the innermost of said pads, means supporting the outermost of said pads for bodily movement relative to the innermost pad to receive the line between said pads, and means movable longitudinally in said container and disposed in said reservoir for supplying dressing to said pads.

2. A line dresser as defined in claim 1 wherein a perforated transverse supporting wall is provided between said innermost pad and said reservoir to support said last pad and defining an end wall of said reservoir.

3. A line dresser for applying dressing to a line, comprising an elongated open-end container, a pair of abutting separable pads axially aligned within said container at one end thereof, means in said container axially aligned with said pads for supplying dressing to said pads, and a closure member axially aligned with said pads and hingedly mounted at the pad end of said container and projecting beyond said open end and contacting one of said pads so that pressure on said closure member will press said pads together.

4. A line dresser as defined in claim 1 wherein a perforated transverse shelf is provided between said innermost pad and said reservoir to support said last pad, said movable means being in the form of a plunger movable toward said shelf to press dressing through said shelf into said pads.

5. A line dresser for applying dressing to a line, comprising an elongated container, a removable perforated shelf within said container, a container closure member hingedly mounted on said shelf, and a pair of axially aligned separable pads between said closure member and said shelf, one said pad resting on said shelf and the other said pad being attached to said closure member to partake of swinging movement therewith.

6. A line dresser for applying dressing to a line, comprising an elongated container, a pair of abutting and axially aligned separable pads within said container at one end thereof, a perforate shelf within said container on which the innermost of said pads rests, a plunger movable in said container toward said shelf to press dressing through said shelf into said pads, and a closure member hingedly mounted from said shelf at the pad end of said container and projecting beyond said end and carrying the outermost of said pads so that pressure on said closure member will press said pads together between said closure member and said shelf.

References Cited in the file of this patent

UNITED STATES PATENTS

| | | |
|---|---|---|
| Re. 18,441 | Switzer | Apr. 26, 1932 |
| 416,659 | Wells et al. | Dec. 3, 1889 |
| 610,192 | Milne | Sept. 6, 1889 |
| 2,366,907 | Hurlbut | Jan. 9, 1945 |
| 2,434,861 | Pachner | Jan. 20, 1948 |
| 2,529,003 | De Witt et al. | Nov. 7, 1950 |
| 2,715,291 | Sweigert | Aug. 16, 1955 |

FOREIGN PATENTS

| | | |
|---|---|---|
| 10,745 | Great Britain | of 1899 |
| 285,197 | Switzerland | Dec. 16, 1952 |
| 853,323 | France | Nov. 28, 1939 |
| 1,003,349 | France | Nov. 14, 1951 |